United States Patent
Taylor

(10) Patent No.: US 11,644,926 B2
(45) Date of Patent: May 9, 2023

(54) CHANGING A PROXIMITY VALUE ASSOCIATED WITH A CAPACITANCE SENSOR

(71) Applicant: Cirque Corporation, Sandy, UT (US)

(72) Inventor: David Taylor, West Jordan, UT (US)

(73) Assignee: Cirque Corporation, Sandy, UT (US)

( * ) Notice: Subject to any disclaimer, the term of this patent is extended or adjusted under 35 U.S.C. 154(b) by 26 days.

(21) Appl. No.: 17/140,372

(22) Filed: Jan. 4, 2021

(65) Prior Publication Data

US 2022/0214796 A1 Jul. 7, 2022

(51) Int. Cl.
*G06F 3/041* (2006.01)
*G06F 3/044* (2006.01)

(52) U.S. Cl.
CPC ........ *G06F 3/04186* (2019.05); *G06F 3/0445* (2019.05); *G06F 3/0446* (2019.05); *G06F 3/0447* (2019.05)

(58) Field of Classification Search
None
See application file for complete search history.

(56) References Cited

U.S. PATENT DOCUMENTS

| | | | |
|---|---|---|---|
| 6,424,338 B1 | 7/2002 | Anderson | |
| 6,459,424 B1 * | 10/2002 | Resman | G06F 3/0488 345/173 |
| 8,933,888 B2 | 1/2015 | Laubach | |
| 10,802,653 B2 * | 10/2020 | Lee | G06F 3/0447 |
| 2004/0252109 A1 * | 12/2004 | Trent, Jr. | G06F 3/03547 345/174 |
| 2008/0273017 A1 | 11/2008 | Woolley | |
| 2010/0007612 A1 | 1/2010 | Locker | |
| 2010/0188268 A1 | 7/2010 | Grignani | |
| 2011/0031041 A1 * | 2/2011 | Bulea | G06F 3/0443 29/829 |
| 2011/0248954 A1 | 10/2011 | Hamada | |
| 2013/0307822 A1 | 11/2013 | Huang | |
| 2014/0192009 A1 * | 7/2014 | Lai | G06F 3/0443 345/174 |
| 2015/0028894 A1 * | 1/2015 | Sleeman | G06F 3/0446 324/662 |
| 2015/0160759 A1 * | 6/2015 | Lien | G06F 3/0448 345/174 |
| 2016/0306496 A1 | 10/2016 | Ishikawa | |
| 2016/0334936 A1 * | 11/2016 | Obata | G06F 3/0412 |
| 2017/0131828 A1 * | 5/2017 | Matta | G06F 3/0412 |
| 2019/0018527 A1 * | 1/2019 | Barel | G06F 3/044 |
| 2019/0155415 A1 * | 5/2019 | Kato | G06F 3/0445 |
| 2021/0286498 A1 * | 9/2021 | Park | G06F 3/04186 |

* cited by examiner

*Primary Examiner* — Amare Mengistu
*Assistant Examiner* — Sarvesh J Nadkarni

(57) ABSTRACT

A device may include a capacitance sensor; an overlay positioned near the capacitance sensor, the overlay including a touch surface opposite to an underside of the overlay, where the underside is positioned near the capacitance sensor; a controller; memory in communication with the controller and including programmed instructions that, when executed, cause the controller to detect a proximity value of an object with a capacitance sensor, where a touch surface is located between the capacitance sensor and the object; determine a planar radial distance of the object away from a predetermined location on the touch surface; and change the proximity value based, at least in part, on the planar radial distance.

20 Claims, 16 Drawing Sheets

| | | | | | | |
|---|---|---|---|---|---|---|
| 1st Angle Set | Distance | 1 | 2 | 3 | 4 | 5 |
| | Offset | .00 | .00 | .00 | .00 | .00 |
| 2nd Angle Set | Distance | 1 | 2 | 3 | 4 | 5 |
| | Offset | .00 | .00 | .5 | .5 | .00 |

Horizontal Distance From Surface Center

| | | | | | | |
|---|---|---|---|---|---|---|
| 1st Angle Set | Distance | 1 | 3 | 4 | 5 | 6 |
| | Offset | .00 | .00 | .00 | .00 | .00 |
| 2nd Angle Set | Distance | 1 | 3 | 4 | 5 | 6 |
| | Offset | .00 | .01 | .03 | .01 | .00 |
| 3rd Angle Set | Distance | 1 | 3 | 4 | 5 | 6 |
| | Offset | .00 | .02 | .05 | .02 | .00 |
| Nth Angle Set | Distance | 1 | 3 | 4 | 5 | 6 |
| | Offset | .00 | x | y | z | .00 |

CHANGING A PROXIMITY VALUE ASSOCIATED WITH A CAPACITANCE SENSOR

FIELD OF THE DISCLOSURE

This disclosure relates generally to systems and methods for detecting objects with a capacitance sensor. In particular, this disclosure relates to systems and methods for correcting a proximity value of a detected object.

BACKGROUND

A touchpad is often incorporated into laptops and other device to provide a mechanism for giving inputs to the device. For example, a touchpad may be positioned adjacent to a keyboard in a laptop and include a surface that can be touched by the user. Touchpads may operate using capacitive sensing, a technology that senses the change of capacitance where a finger touches the pad. Styluses or other types of electrically conductive objects may also be detectable with capacitance sensing.

SUMMARY

In some embodiments, a device may include a capacitance sensor, an overlay positioned near the capacitance sensor, the overlay including a touch surface opposite to an underside of the overlay, where the underside is positioned near the capacitance sensor, a controller, memory in communication with the controller and including programmed instructions that, when executed, cause the controller to detect a proximity value of an object with a capacitance sensor, where a touch surface is located between the capacitance sensor and the object; determine a planar radial distance of the object away from a predetermined location on the touch surface; and change the proximity value based, at least in part, on the planar radial distance.

The predetermined location on the touch surface may be a center of the touch surface.

The touch surface may include a non-planar surface.

The overlay may have a non-uniform thickness.

The overlay may have a circular shape.

The overlay may have a symmetric proximity value sensitivity.

The device may include a material located between the capacitance sensor and the touch surface where the material decreases a proximity value sensitivity.

A change to the proximity value may be the same regardless of the planar angular position of the object with respect to the predetermined location.

Changing the proximity values may include a data set of offset coefficients associated with the planar radial distance and where changing the proximity value includes, at least in part, identifying a unit of the data set at the determined planar radial distance, identifying an offset coefficient correlated with the determined planar radial distance in the data set, and applying the identified offset coefficient to the proximity value.

The device may include determining a planar angular position of the object and changing the proximity value based, at least in part, on both the planar radial distance and the planar angular position.

The change made to the proximity value may be different depending on whether the planar angular position is within a first angular range or a second angular range The device may include a data set of offset coefficients associated with both the planar radial distance and the angular position where changing the proximity value may include, at least in part, identifying a unit of the data set at the determined planar radial distance and associated with an angular range in which the object is located, identifying an offset coefficient correlated with the determined planar radial distance and the angular range in the data set, and applying the identified offset coefficient to the proximity value.

The device may be a remote controller.

The device may be incorporated into a portable computing device.

In some embodiments, a method of using a capacitance sensor may include detecting a proximity value of an object with a capacitance sensor, where a touch surface is located between the capacitance sensor and the object; determining a planar radial distance of the object away from a predetermined location on the touch surface; and changing the proximity value based, at least in part, on the planar radial distance.

The predetermined location on the touch surface may be a center of the touch surface.

The method may include determining a planar angular position of the object; and changing the proximity value based, at least in part, on both the planar radial distance and the planar angular position.

In some embodiments, a computer-program product for using a capacitance sensor; the computer-program product including a non-transitory computer-readable medium storing instructions executable may be by a processor to detect a proximity value of an object with a capacitance sensor, where a touch surface is located between the capacitance sensor and the object; determine a planar radial distance of the object away from a predetermined location on the touch surface; and change the proximity value based, at least in part, on the planar radial distance.

The instructions may be executable by a processor to determine a planar angular position of the object and change the proximity value based, at least in part, on both the planar radial distance and the planar angular position.

The instructions may be executable by a processor to identify which angular range of the planar angular position, identify a unit of the data set at the determined planar radial distance and associated with that identified angular range; identify an offset coefficient correlated with the determined planar radial distance in the data set, and apply the identified offset coefficient to the proximity value.

Figure 1:
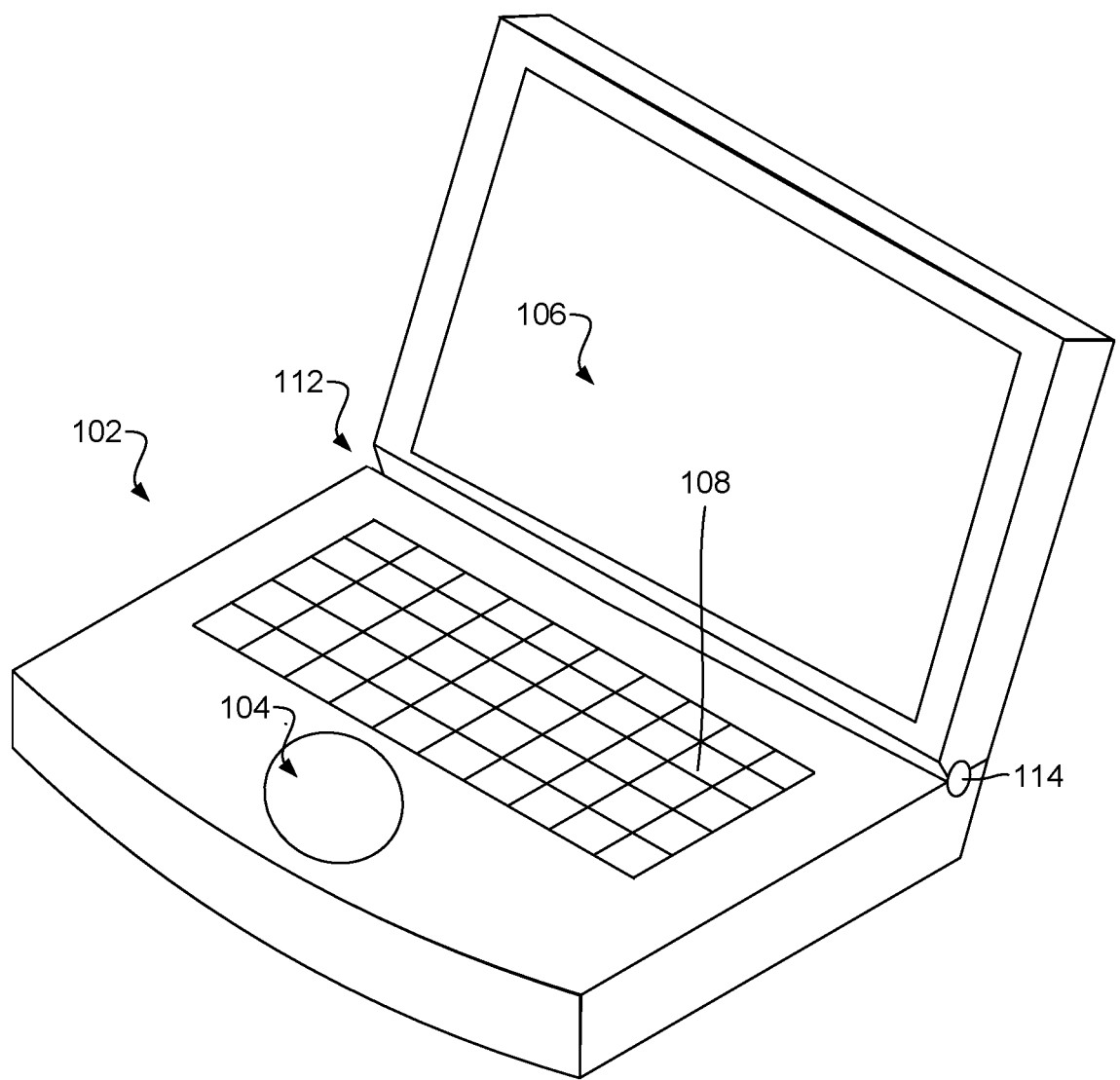
FIG. 1 depicts an example of a portable electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "portable electronic device" may generally refer to devices that can be transported and include a battery and electronic components. Examples may include an electric vehicle, a hybrid vehicle, a laptop, a desktop, a mobile phone, an electronic tablet, a personal digital device, a watch, a gaming controller, a wearable device, another type of device, or combinations thereof.

It should be understood that use of the terms "touch pad" and "touch sensor" throughout this document may be used interchangeably with "capacitive touch sensor," "capacitive sensor," "capacitive touch and proximity sensor," "proximity sensor," "touch and proximity sensor," "touch panel," "trackpad", "touch pad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

For the purposes of this disclosure, the term "overlay" generally refers a tangible material that is generally transparent or semi-transparent to electrical fields. The overlay may be made out of any appropriate material that has an appropriate transparency to allow changes in capacitance to be detected with a capacitance sensor when the overlay is positioned between the capacitance sensor and the object that is affecting the change in capacitance. Often, the overlay may include a touch surface that a user can touch with his or her finger or another type of object that can be used as a tactile feedback for providing input to the capacitance sensor. However, proximity away from the capacitance sensor, rather than actually touching the touch surface, may be used as the input by the controller to interpret the user's input. In some cases, the overlay is incorporated into a display screen, a touch pad assembly, a kiosk, another type of device, or combinations thereof.

For the purposes of this disclosure, the term "proximity value" generally refers to a change in capacitance based on the presence of an electrically conductive object spaced away from the capacitance sensor. In some cases, the closer the object approaches the capacitance sensor, the greater the change in capacitance resulting in a higher proximity value. For the purposes of this disclosure, the term "planar radial distance" generally refers to a distance away from a predetermined location on the touch surface in a direction that is aligned with the capacitance sensor and/or the touch surface. For the purposes of this disclosure, the term "planar angular position" generally refers to the angular relationship between positions that are aligned with the length and width of the capacitance sensor.

For the purposes of this disclosure, the term "proximity value sensitivity" generally refers to the ability of the capacitance sensor to detect when an object is touching the touch surface. The sensitivity may be affected by the thickness of the overlay, the material of the overlay, the distance between the capacitance sensor and the touch surface, the materials between the overlay and the capacitance sensor, and any inconsistencies in these thickness and/or materials. For example, the proximity value sensitivity may change when an object moves across a touch surface of an overlay when the touch surface has a changing distance away from the capacitance sensor (i.e., an inconsistent distance between the touch surface and the capacitance sensor). In another example, the proximity value sensitivity may change when something is placed between the underside of the overlay and the capacitance sensor. For example, a light emitting diode or another type of device that is positioned between the overlay and the capacitance sensor may affect the sensitivity at that region of the touch surface corresponding to where the light emitting diode is located. While some examples of how the proximity value sensitivity may be affected are disclosed above, other materials, sizes, shapes, thickness, insertions, cutouts, transparencies, and so forth may affect the proximity value sensitivity.

For the purposes of this disclosure, the term "angular range" generally refers to a set of angles radiating from a predetermined location generally used to define an area of a surface. For the purposes of this disclosure, the term "remote controller" generally refers to a computing device that sends instructions to another device for operation. A non-exhaustive list of remote controllers may include gaming controllers, industrial equipment controllers, drone controllers, television controllers, display controllers, vehicle controllers, drone controllers, other types of controllers, or combinations thereof.

FIG. 1 depicts an example of a portable electronic device 100. In this example, the portable electronic device is a laptop. In the illustrated example, the portable electronic device 100 includes input components, such as a keyboard 102 and a touch pad 104. The portable electronic device 100 also includes a display 106. A program operated by the portable electronic device 100 may be depicted in the display 106 and controlled by a sequence of instructions that are provided by the user through the keyboard 102 and/or through the touch pad 104. An internal battery (not shown) may be used to power the operations of the portable electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 may include a capacitance sensor disposed underneath a surface containing the keyboard 102. In some examples, the touch pad 104 is located in an area of the keyboard's surface where the user's palms may rest while typing. The capacitance sensor may include a printed circuit board that includes a first layer of electrodes oriented in a first direction and a second layer of electrodes oriented in a second direction that is transverse the first direction. These layers may be spaced apart and/or electrically isolated from each other so that the electrodes on the different layers do not electrically short to each other. Capacitance may be measured at the overlapping intersections between the electrodes on the different layers. However, as the user's finger or other electrically conductive objects approach the intersections, the capacitance may change. These capacitance changes and their associated locations may be quantified to determine where the user is touching or hovering his or her finger within the area of the touch pad 104. In some examples, the first set of electrodes and the second set of electrodes are equidistantly spaced with respect to each other. Thus, in these examples, the sensitivity of the touch pad 104 is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may include a capacitance sensor that is located behind an outside surface of the display 106. As a user's finger or other electrically conductive object approaches the touch sensitive screen, the capacitance sensor may detect a change in capacitance as an input from the user.

While the example of FIG. 1 depicts an example of the portable electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, another type of portable electronic device, another type of device, or combinations thereof.

Figure 2:
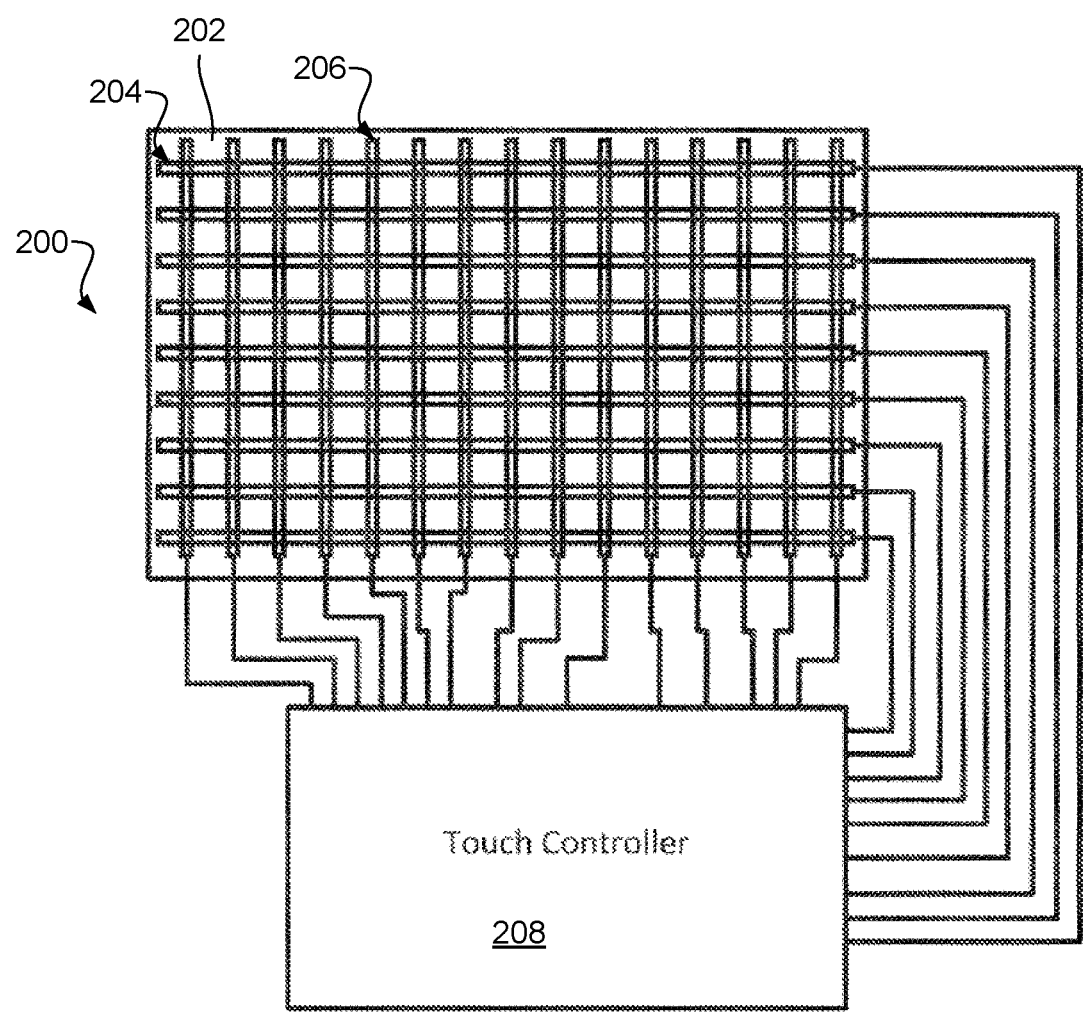
FIG. 2 depicts an example of a substrate with a first set of electrodes and a second set of electrodes in accordance with the disclosure.

FIG. 2 depicts an example of a portion of a touch input component 200. In this example, the touch input component 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The touch input component 200 may include one or more electrodes in the first set 204 or the second set 206. Such a substrate 200 and electrode sets may be incorporated into a touch screen, a touch pad, and/or swell detection circuitry incorporated into a battery assembly.

In some examples, the touch input component 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the touch input controller 200 includes a touch controller 208. The touch controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the touch controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A ground plane shield (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the touch input component 200. The touch input component 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the touch input component 200, the touch controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the touch input component 200 having the flexibility of the switching the sets 204, 206 of electrodes between sense and transmit electrodes, in other examples, each set of electrodes is dedicated to either a transmit function or a sense function.

Figure 3:
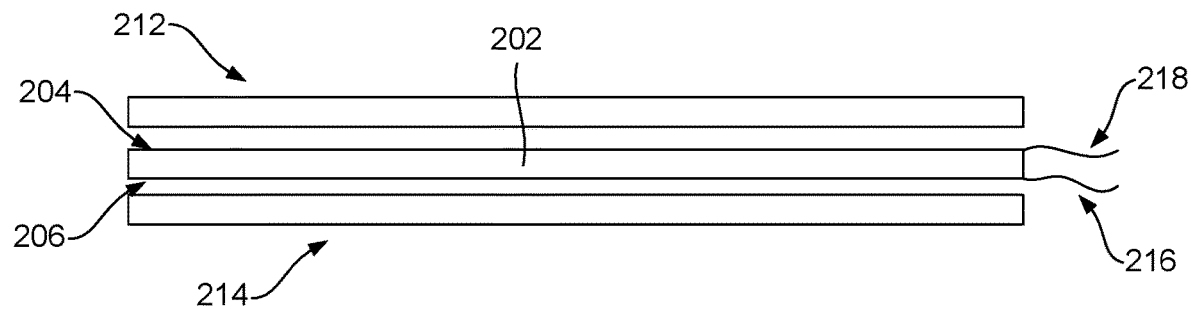
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a touch pad. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 200. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a touch pad, the substrate 202 may be located between a touch surface 212 and a shield 214. The touch surface 212 may be a covering that is placed over the first side of the substrate 202 and that is at least partially transparent to electric fields. As a user's finger or stylus approach the touch surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the portable electronic device. This shield may prevent influence on the electric fields on the substrate 202.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

Figure 4:
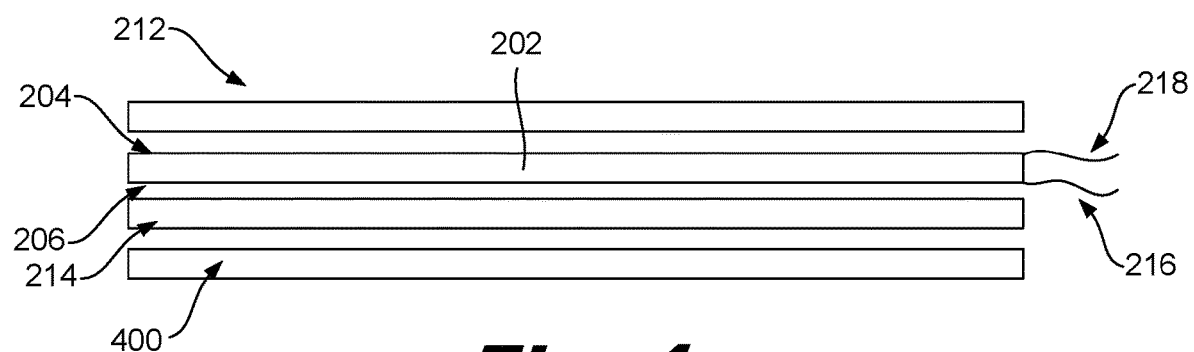
FIG. 4 depicts an example of a touch screen in accordance with the disclosure.

FIG. 4 depicts an example of a touch screen as the touch input controller. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display 400. The display 400 may be a layer of pixels or diodes that illuminate to generate an image. The display may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 208, the substrate 202, and the touch surface 212 may all be at least partially transparent to allow the display to be visible to the user through the touch surface 212. Such a touch screen may be included in a monitor, a display assembly, a laptop, a mobile phone, a mobile device, an electronic tablet, another type of portable electronic device, or combinations thereof.

Figure 5:
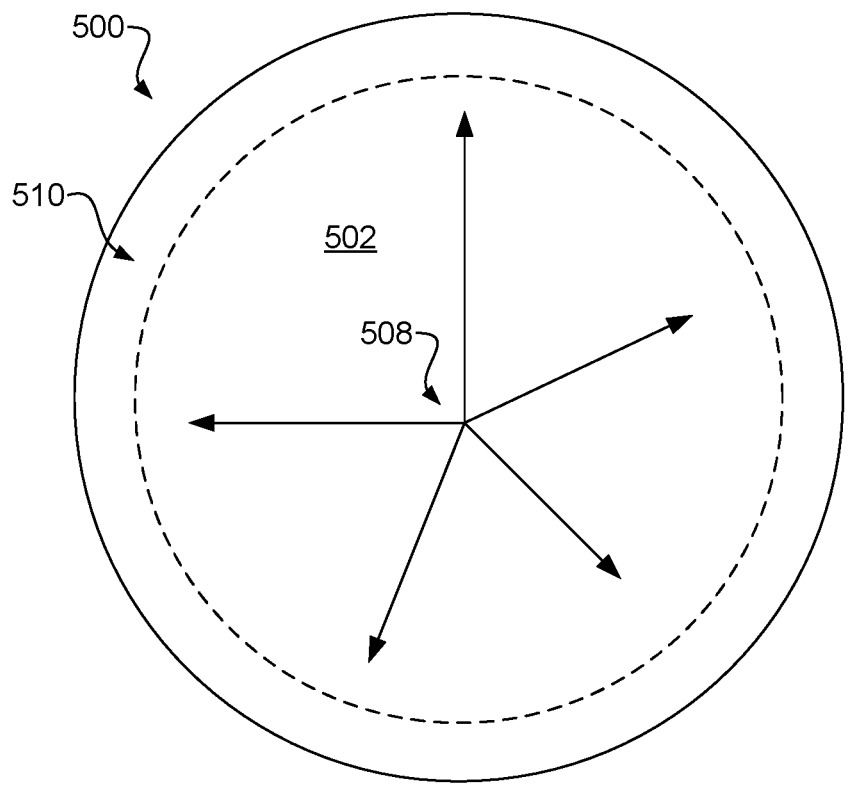
FIG. 5 depicts an example of an overlay in accordance with the disclosure.
Figure 6:
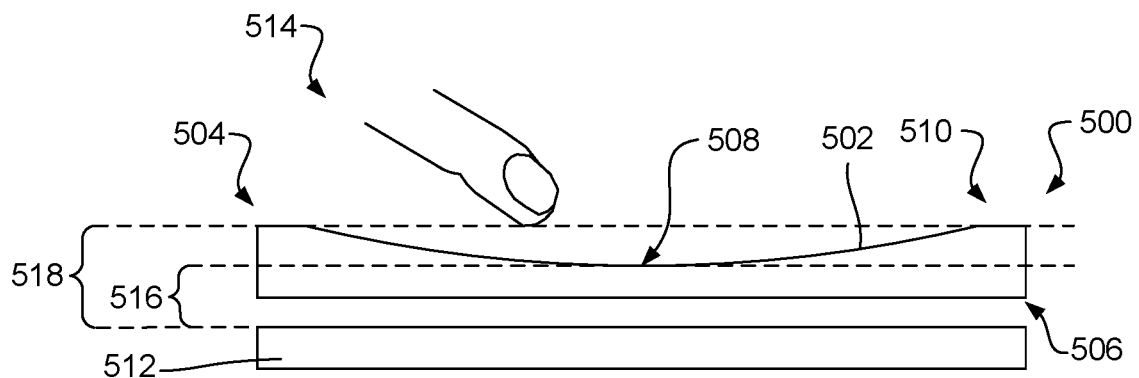
FIG. 6 depicts an example of a side view of an overlay and capacitance sensor in accordance with the disclosure.

FIGS. 5 and 6 depict an example of an overlay 500 with a touch surface 502 formed on a first side 504 of the overlay 500. The first side 504 may be opposite to the underside 506 of the overlay 500. The overlay 500 may be made of any appropriate material. In some examples, the overlay 500 is made of a plastic material.

In this illustrated example, the overlay has a circular shape. Also, the overlay 500 has a non-uniform cross-sectional thickness so that the touch surface 502 is concave. Thus, the center 508 of the overlay is thinner than those areas near the overlay's circumference 510.

In this example, the overlay 500 is positioned between the capacitance sensor 512 and an object 514 intended to provide an input to the capacitance sensor 512. In this example, the object is a user's finger. However, in other examples, a stylus or another type of object may be used. The touch surface 502 of the overlay 500 provides a limit on how close the object 514 can approach the capacitance sensor 512. The overlay 500 may be transparent or semi-transparent to the electrical field changes generated between the capacitance sensor 512 and the object 514. In such cases, an actual touch of the overlay's touch surface 502 is not registered with the electronics interpreting the capacitance input 512. But, the distance at which the object 514 comes into contact with the touch surface 502 can be derived from the proximity value. Such a method may be sufficient when the touch surface is aligned with the capacitance sensor, and the touch surface is planar. In the illustrated example the touch surface 502 is non-planar because the touch surface is concave. Other examples of a non-planar surface include, but are not limited to, surfaces that are convex, have discontinuities, have a varying elevation, incorporates protrusions, recess, and/or other features, and so on. An object 514 may be in contact with the touch surface 502 at a central location and be a first distance away from the capacitance sensor 512. However, at a peripheral location, the different cross-sectional thickness of the touch surface 502 results in a touch being a farther distance away from the capacitance sensor 512 than when at the central location. As a result, one touch may be associated with a first proximity value, while a second touch may be interpreted to be at a second proximity value that is different than the first proximity value. When the touch controller correlates a specific proximity value to be a touch by the object 514 on the touch surface 502, then these different proximity values caused by the non-planar surface can cause conflicting interpretations. For example, if the proximity value is set too high, the portions of the touch surface 502 with thinner cross-sectional thicknesses 516 may be correctly interpreted as a touch to the touch surface 502, while touches to portions of the touch surface 502 with thicker cross-sectional thicknesses 518 may be interpreted as being too far away from touch surface 502 to be making contact with the touch surface 502. In another example, if the proximity value is set too low, then those touches on the portions of the touch surface with the thicker cross-sectional thicknesses 518 may be correctly interpreted as touches. But, in the same example, when the object 514 approaches those regions of the touch surface 502 with thinner cross-sectional thicknesses 516, the controller may misinterpret a hovering object as making actual contact with the touch surface 502 when no contact is made or intended by a user.

In the examples depicted in FIGS. 5 and 6 the change in cross-sectional thicknesses from the center 508 of the touch surface has the same changes regardless of the direction from which the object 514 may move. As a result, the same changes in the proximity value will be the same regardless of which direction from which the object 514 moves if the object 514 remains in contact with the touch surface 502. Thus, in this example, regardless of the angular direction from the touch surface's center 508 from which an object 514 moves, the capacitance sensor 512 records the same changes in proximity value. These changes may be interpreted as changing distances from the touch surface 502 even though the object 514 stays in contact with the touch surface 502. In one example, when the object 514 contacts the touch surface's center 508, the capacitance sensor may interpret the changes in capacitance to be a touch to the touch surface 502. But, as the object 514 moves outwardly towards the periphery of the touch surface 502 while staying in contact with the touch surface 502, the capacitance sensor may interpret the object 514 as moving off of and hovering over the touch surface 502.

Figure 7:
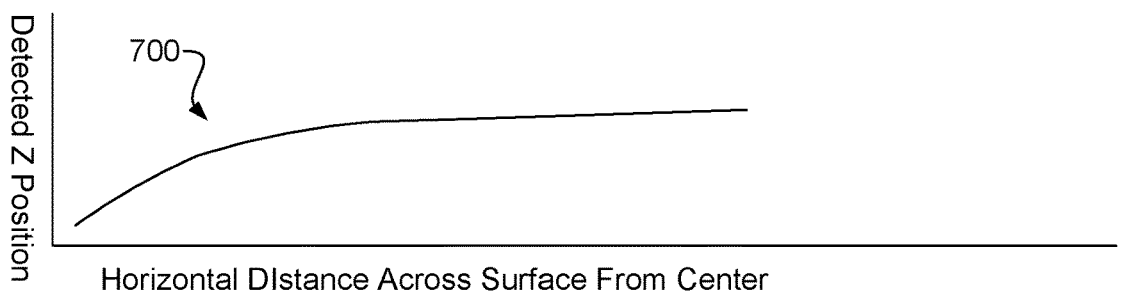
FIG. 7 depicts an example of a proximity value radial profile in accordance with the disclosure.

FIG. 7 depicts an example of the radial profile 700 of how the proximity value changes as an object moves across a touch surface from the center (or another predetermined location) while still maintaining contact with the touch surface. In this example, the proximity value detects that the object is closer to the capacitance sensor, but that the object moves farther away from the capacitance sensor as the object moves along the touch surface. In some cases, the controller may interpret different instructions based on whether an object is in contact with the touch surface rather than just hovering over the touch surface. Thus, the changing proximity values may cause the controller to misunderstand an intended input by a user.

Figure 8:
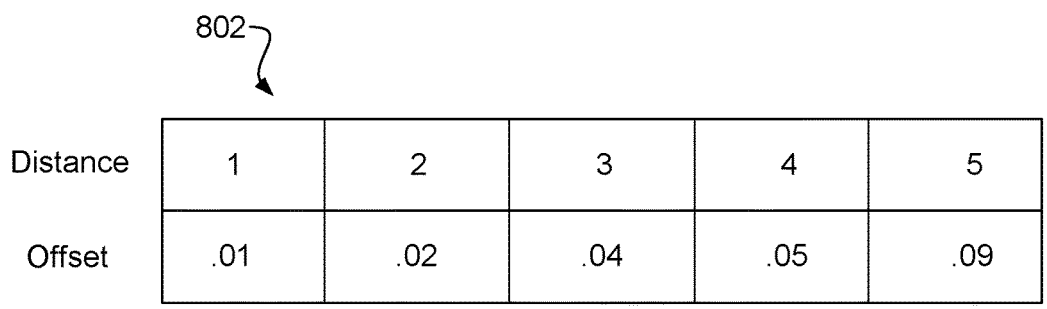
FIG. 8 depicts an example of a data set in accordance with the disclosure.
Figure 9:
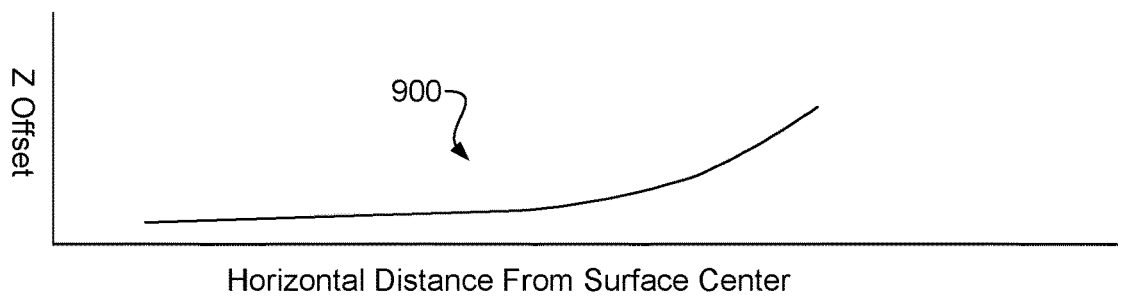
FIG. 9 depicts an example of a radial offset profile in accordance with the disclosure.

FIG. 8 depicts a data set with offset coefficients that can be applied to change the proximity value to at least more closely align with the distance from the touch surface rather than just away from the capacitance sensor. In this example, the data set correlates the offset coefficient 800 based purely on the radial distance 802 that the object is away from a predetermined location on the touch surface (e.g. the center). Since the change in the proximity value is the same regardless of the angular direction from the predetermined location, a single offset coefficient can be stored per unit of planar radial distance. FIG. 9 depicts an offset radial profile 900 based on the planar radial distance away from a predetermined location on the touch surface. In some cases, the predetermined touch surface is the center of the touch surface.

Figure 10:
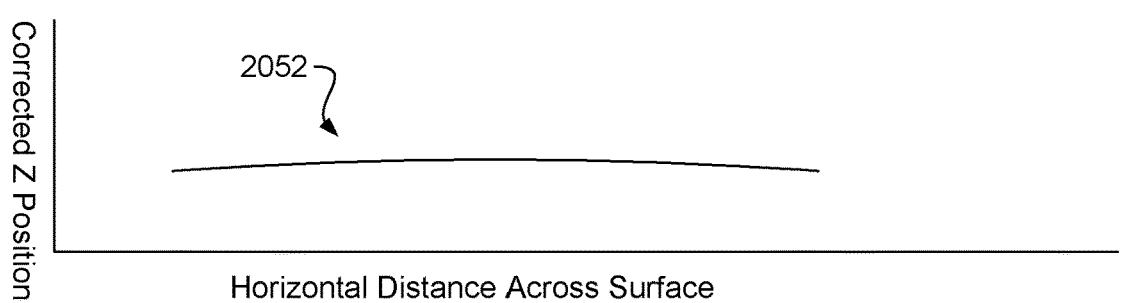
FIG. 10 depicts an example of a changed proximity values in accordance with the disclosure.

FIG. 10 depicts an example of the adjusted proximity profile 1000 after the offset is applied with respect to the planar radial distance. In the example of FIG. 10, the proximity value is depicted as staying the same. Thus, the controller may determine that the object stays in contact with the touch surface.

As an example, the capacitance sensor may initially determine that the object is above the touch surface by detecting a change in capacitance. This detection may be caused by the object hovering over the touch surface or the object actually touching the touch surface. Determining whether the object is touching or merely hovering over the touch surface may be based on how much the capacitance has changed. The size of that change may be correlated to a proximity value. Depending on the proximity value, the controller may interpret the object's three-dimensional Z distance to be either on the touch surface or above the touch surface. The controller may also determine the planar radial distance that the object is away from the predetermined location by identifying the two-dimensional X and Y position of the object with respect to the capacitance sensor. In those examples where the capacitance sensor uses mutual capacitance, the X and Y position may be correlated with the junction where the transmit and sense electrodes are measuring the change in capacitance. In some examples, before determining the Z distance, the controller may calculate the planar radial distance from the X and Y position. Once the planar radial distance is determined, the controller can consult the data set and determine what offset to apply to the proximity value. After the proximity value is adjusted, the controller may determine whether the object is in contact with the touch surface. In some cases, if the adjusted proximity value is determined to be above a predetermined threshold, then the object is determined to be in contact with the touch surface. Conversely, if the adjusted proximity value fails to reach the threshold, then the object may be determined to be hovering above the touch surface.

Determining the planar radial distance to adjust the proximity value provides the advantage of simplifying calculations and speeding up processing. An alternative to using the planar radial distance is to correlate an offset value per every X and Y coordinate location on the touch surface to determine the offset. This involves calculating an offset value for each combination of two different variables (i.e., X and Y positions). On the other hand, using the radial distance, just one offset value per a single variable (i.e., the radial distance) is used. Thus, processing speed, power consumption, and memory requirements are reduced.

Figure 11:
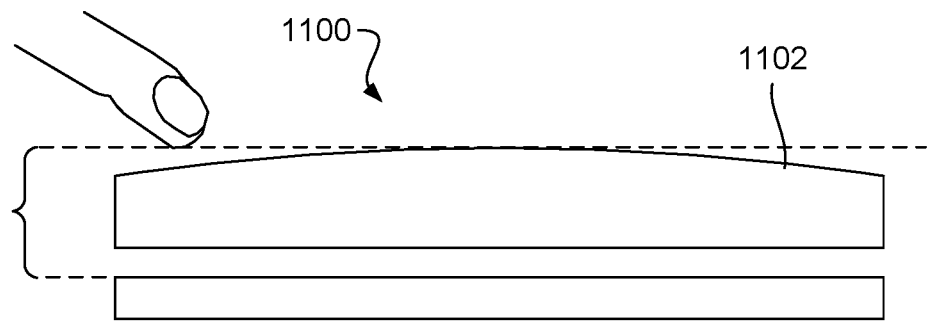
FIG. 11 depicts an example of a side view of an overlay and capacitance sensor in accordance with the disclosure.
Figure 12:
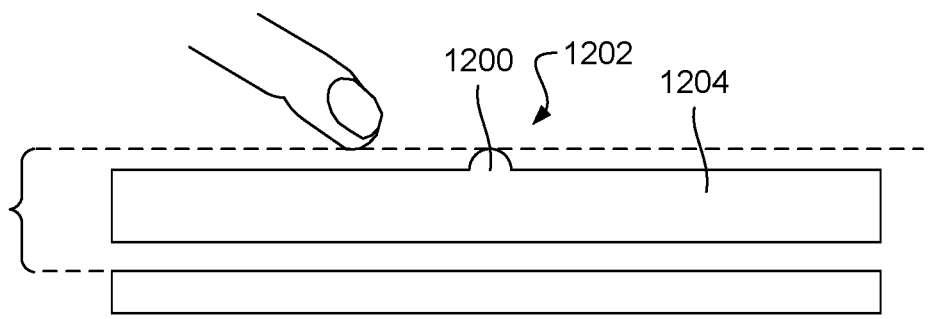
FIG. 12 depicts an example of a side view of an overlay and capacitance sensor in accordance with the disclosure.
Figure 13:
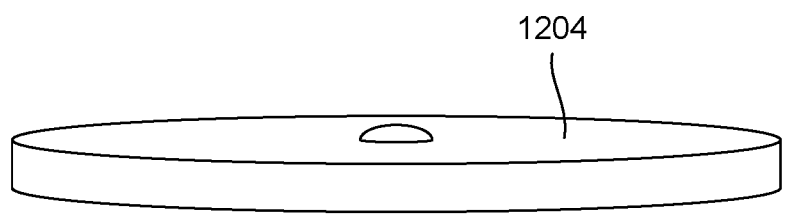
FIG. 13 depicts an example of a perspective view of an overlay in accordance with the disclosure.

This advantage may be applied to any touch surface that has a symmetric radial proximity radial profile in any direction. In the above examples, the overlay included a concave surface that caused the inconsistent proximity values. However, storing an offset value per a single variable may be used in other applications where the radial proximity values are consistent regardless of the angular direction. For example, FIG. 11 depicts an example of an overlay 1100 with a convex touch surface 1102, which may also include a consistent radial proximity profile regardless of the direction. FIG. 12 includes an example, where a single protrusion 1200 is located at the center 1202 of an overlay 1204. The protrusion may help users identify that they are touching the center of the touch surface without requiring them to visually look to determine where they are touching. However, the protrusion 1200 may skew the controller's interpretation of whether the object is touching the touch surface or not. The example in FIG. 12 also has a consistent radial proximity profile regardless of the direction. Thus, this type of overlay may benefit from storing an offset value based on the radial position. FIG. 13 depicts a perspective view of the overlay 1204 of FIG. 12.

Figure 14:
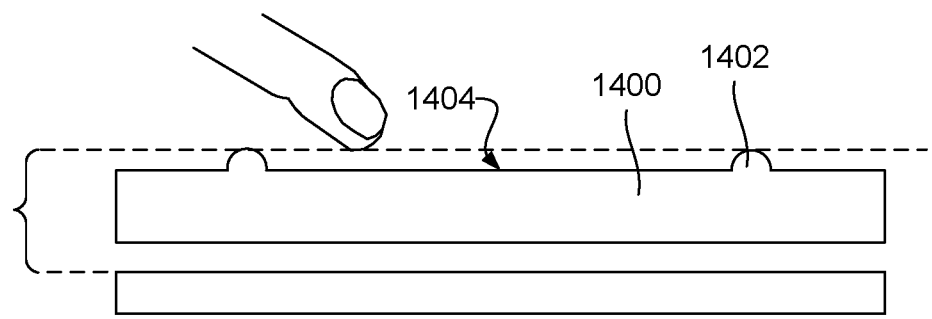
FIG. 14 depicts an example of a side view of an overlay and capacitance sensor in accordance with the disclosure.
Figure 15:
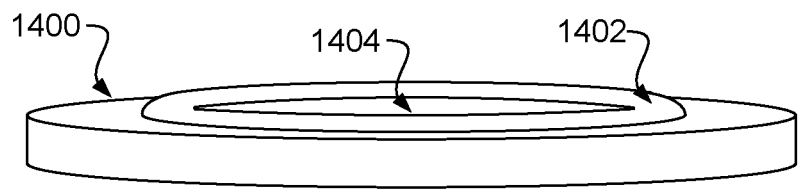
FIG. 15 depicts an example of a perspective view of an overlay in accordance with the disclosure.
Figure 16:
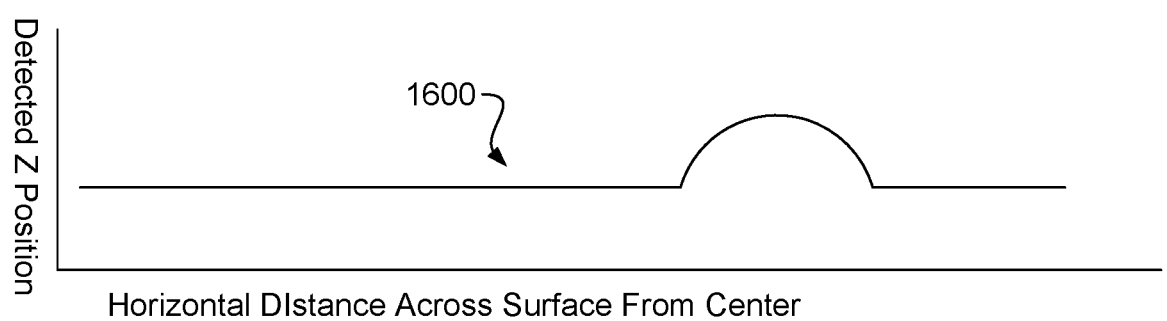
FIG. 16 depicts an example of a proximity value radial profile in accordance with the disclosure.

FIGS. 14-16 depict an example of an overlay 1400 with a peripheral ring 1402 that protrudes outwards causing the overlay 1400 to have an inconsistent cross-sectional thickness. A cross-sectional view is depicted in FIG. 14, and a perspective view is depicted in FIG. 15. In this example, the peripheral ring 1402 is symmetrically located about a center 1404 of the overlay's touch surface. Thus, the proximity value radial profile 1600, as depicted in FIG. 16, may be the same regardless of the angular direction regardless of the direction moving away from the center of the touch surface. This type of example may also benefit from the advantages of storing a single offset value per planar radial distance.

Figure 17:
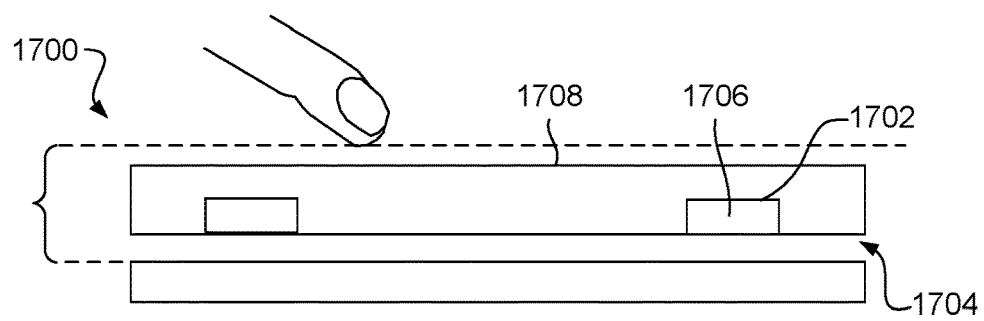
FIG. 17 depicts an example of LEDs incorporated into an underside of an overlay in accordance with the disclosure.
Figure 18:
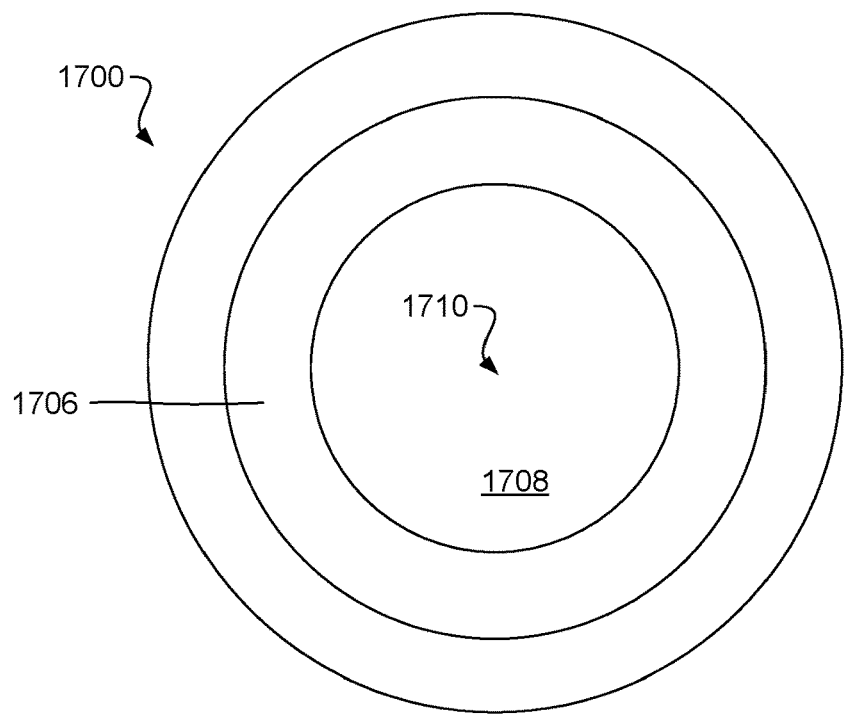
FIG. 18 depicts an example of LEDs incorporated into an overlay in accordance with the disclosure.
Figure 19:
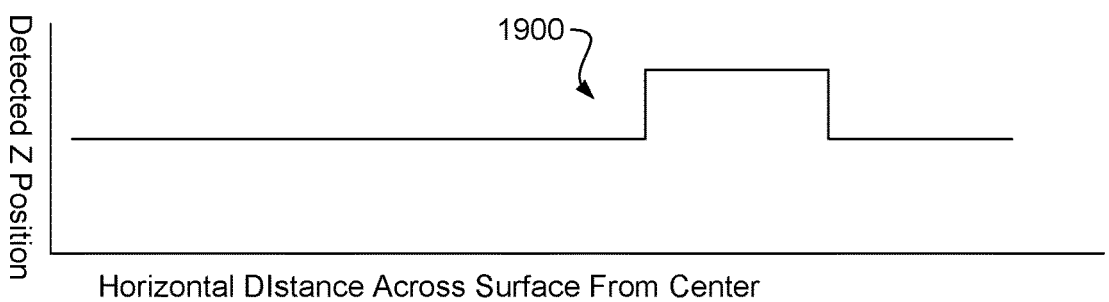
FIG. 19 depicts an example a proximity value radial profile in accordance with the disclosure.
Figure 20:
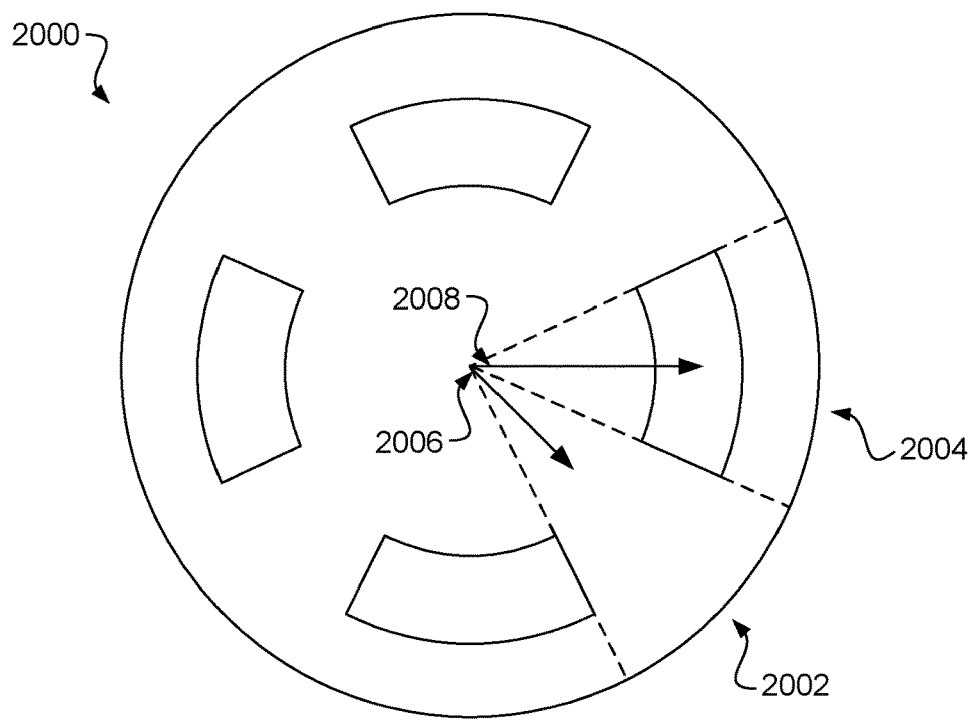
FIG. 20 depicts an example an overlay with different proximity value sensitivities in accordance with the disclosure.

FIGS. 17-19 depict an example of an overlay 1700 with a cutout 1702 in the overlay's underside 1704. A light emitting diode 1706 (or another type of object with a different electrical field transparency) may be inserted into the cutout 1702 causing the overlay 1700 to have an inconsistent cross-sectional thickness. In some cases, where the material of the overlay has a different electric field transparency than the ambient air, the cutout may cause the overlay to have inconsistent proximity values. A cross-sectional view of this example is depicted in FIG. 17, and a top view is depicted in FIG. 18. In this example, the light emitting diodes 1706 may be used to illuminate under the touch surface 1708 and be visible through the touch surface. In this example, the arrangement of light emitting diodes 1706 may be symmetrically located about a center 1710 of the overlay's touch surface 1708. Thus, the proximity value radial profile 1900, as depicted in FIG. 19, may be the same regardless of the angular direction moving away from the center of the touch surface 1904. This this type of example may also benefit from the advantages of storing a single offset value per planar radial distance.

FIGS. 20-24 depict an example of an overlay 2000 that has two different proximity value radial profiles. In a first section 2002, the overlay 2000 has a proximity value radial profile that is consistent. In a second section 2004, the overlay 2000 has a proximity value radial profile that is inconsistent. In this particular example, the second section 2004 may include a protrusion, a light emitting diode, a cutout with another type of device inserted, a coating that has a different transparency to electric fields, another feature that causes a change in the proximity value sensitivity, or combinations thereof. In this example, the first and second sections are divided into multiple subsections that are not contiguous. While not contiguous, each of the subsections have the same proximity value radial profiles.

Figure 21:
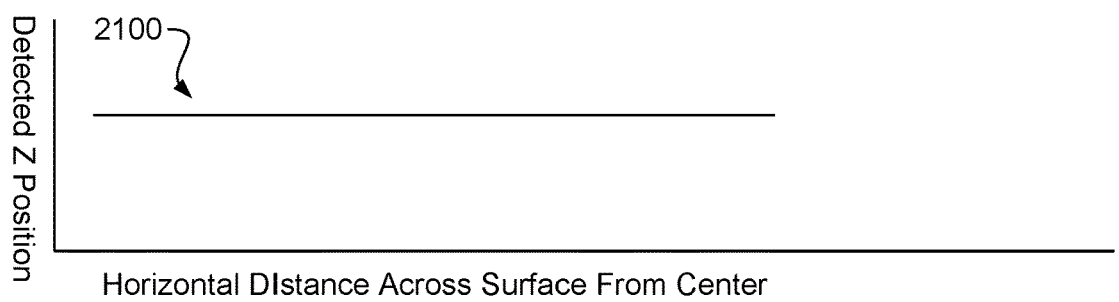
FIG. 21 depicts an example of a first proximity value radial profile of a first area of a touch surface in accordance with the disclosure.

In the illustrated example, the proximity value radial profile of the first section 2002 is consistent within a first angular range 2006 defined by a first set of angular directions from the center of the touch surface 2008. For example, the first proximity value radial profile 2100 is depicted in FIG. 21. In this example, the proximity value radial profile has no changes as the object stays in contact with the touch surface across the distance between the center of the touch surface to the outer edge of the touch surface.

Figure 22:
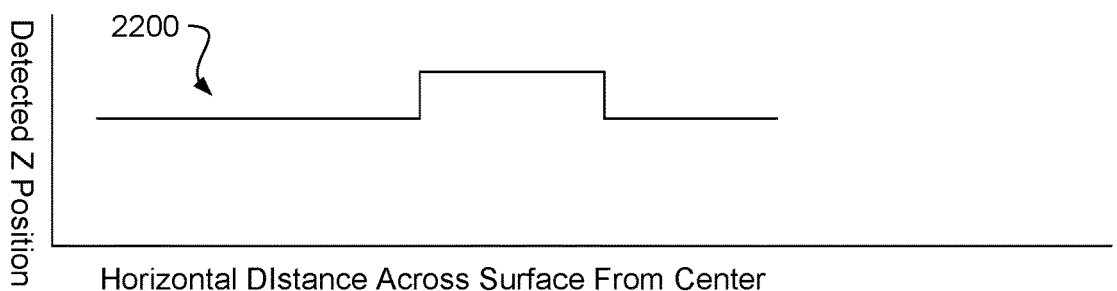
FIG. 22 depicts an example of a second proximity value radial profile a second area of a touch surface in accordance with the disclosure.

Similarly, the proximity value radial profile is the same throughout the second section 2004 defined by a second angular range defined by a second set of angular directions from the center of the touch surface 2008. The second proximity value radial profile 2200 is depicted in FIG. 22. In this example, the second section has a change in the proximity value radial profile as the object stays in contact with the touch surface across the distance between the center of the touch surface to the outer edge of the touch surface.

Figures 23, 24:
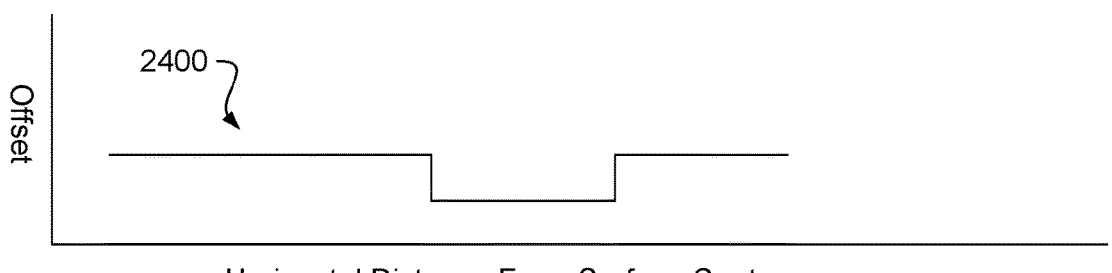
FIG. 23 depicts an example of a data set of offsets associated with different proximity value sensitivities in accordance with the disclosure.
FIG. 24 depicts an example of a radial offset profile an area of a touch surface in accordance with the disclosure.
Figure 25:
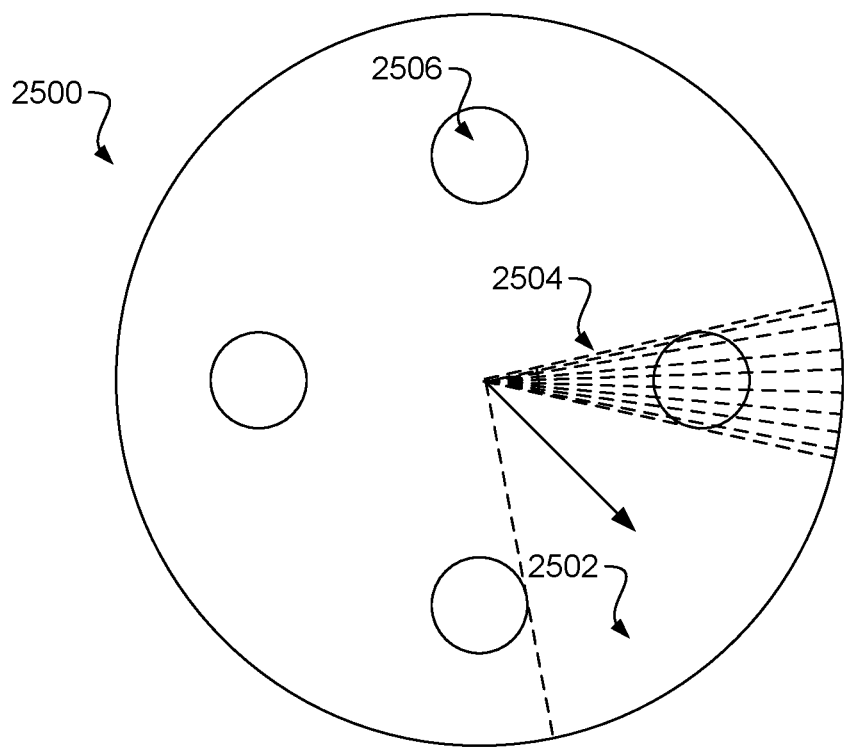
FIG. 25 depicts an example of a touch surface with different proximity value radial profiles in accordance with the disclosure.

FIG. 23 depicts an example of a data set 2300 that associates the offset coefficient by both the angular position 2302 of the object and the radial distance 2304. As can be seen, for the first section 2002 (see, FIG. 20) where the proximity value radial profile does not change, there are no offset coefficients. In this case, no offsets are needed when the object is detected within the area defined by the first angular range. However, there are offset coefficients 2306 associated with the planar radial distance 2304 and the angular range 2302 of the second section 2004 (see, FIG. 20). This offset radial profile 2400 is depicted in FIG. 24.

As an example with the process of using an overlay depicted in FIGS. 20-24, the capacitance sensor may initially determine that the object is above the touch surface by detecting a change in capacitance. The controller may determine the radial distance that the object is away from the predetermined location by identifying the two-dimensional X and Y position of the object with respect to the capacitance sensor. Further, the two-dimensional X and Y coordinates may also be used to determine what angular position the object is with respect to the center of the touch surface. The controller can consult with the data set to find the appropriate offset coefficient to be applied based on both the angular position and the radial distance. After the proximity value is adjusted, the controller may determine whether the object is in contact with the touch surface.

FIGS. 25-28 depict an example of an overlay 2500 that has multiple different proximity value radial profiles from multiple different sections. In a first section 2502, the overlay 2500 has a proximity value radial profile that is consistent. For the purposes of this example, the first section 2502 may be flat with a consistent proximity value radial profile. The first section 2502 may have multiple subsections that are not contiguous, similar to the example depicted in FIG. 20.

Figure 26:
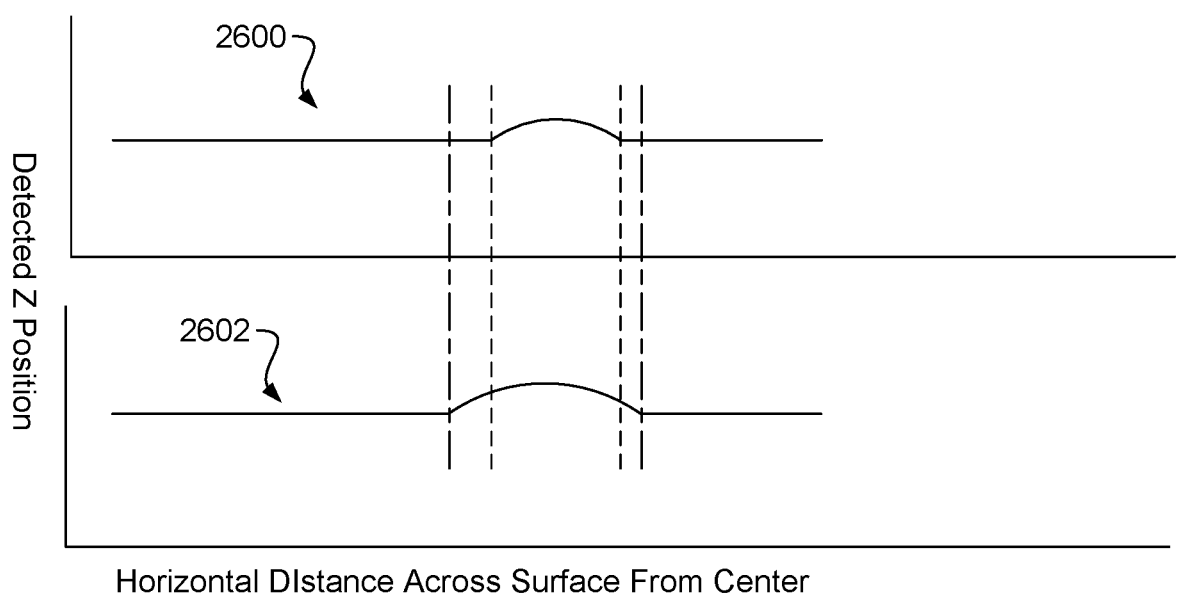
FIG. 26 depicts an example of different proximity value radial profiles in accordance with the disclosure.

The other sections 2504 may have a proximity value radial profiles that are inconsistent and also different from each other. In this particular example, the other sections 2504 may include a circular feature 2506 that causes a change in the proximity value sensitivity. The circular feature 2506 may span across multiple sections. The shape of the circular feature may cause each proximity value radial profile within the angular range that spans the circular feature 2506 to be different. In some examples, this area outside of the first section 2502 may be divided into multiple sections that each have a single representative proximity value radial profiles that is a close enough approximation of the actual proximity value radial profiles. The smaller the sections are divided, the more accurate each of the representative proximity value radial profiles can be. However, the more sections, the more memory that is required to store each of the data points in the data set. FIG. 26 depicts an example of comparing a first representative proximity value radial profile 2600 of one of the divided sections with a second representative proximity value radial profile 2602 of an adjacent divided section. FIG. 26 depicts that while these profiles are similar, the changes in the proximity value sensitivity begin and end at different radial distances.

Figures 27, 28:
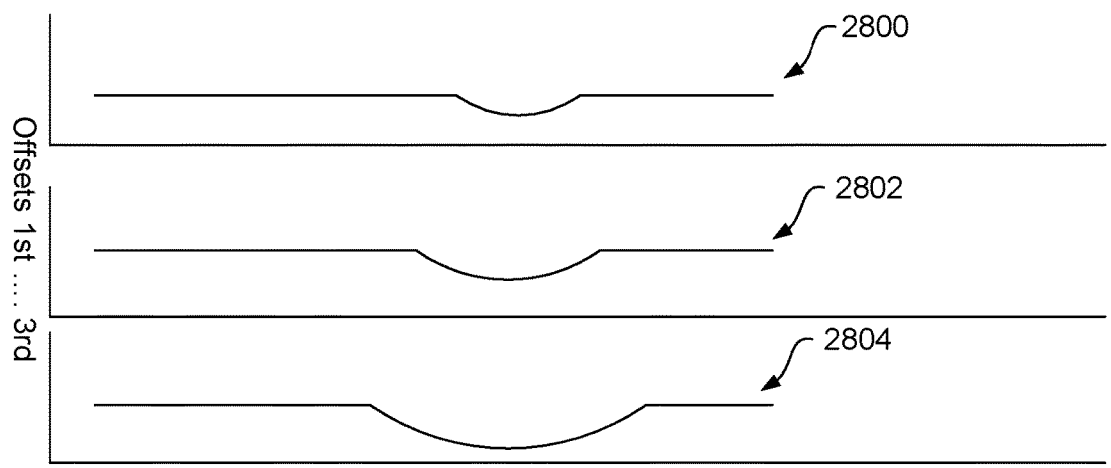
FIG. 27 depicts an example of a data set of offset values associated with radial distances and angular positions in accordance with the disclosure.
FIG. 28 depicts an example of different radial offset profiles in accordance with the disclosure.

Each of the representative proximity value radial profiles can be associated with different angular ranges. FIG. 27 depicts an associated data set 2700 that provides offset coefficients 2702 for each of the representative proximity value radial profiles based on the angular position. FIG. 28 depicts an example of representative offset radial profiles 2800, 2802, 2804. While each of these offset radial profiles may not be as precise, these representative offset profiles can still be applied to the proximity values and improve the accuracy of determining when there is a touch on the touch surface.

Figure 29:
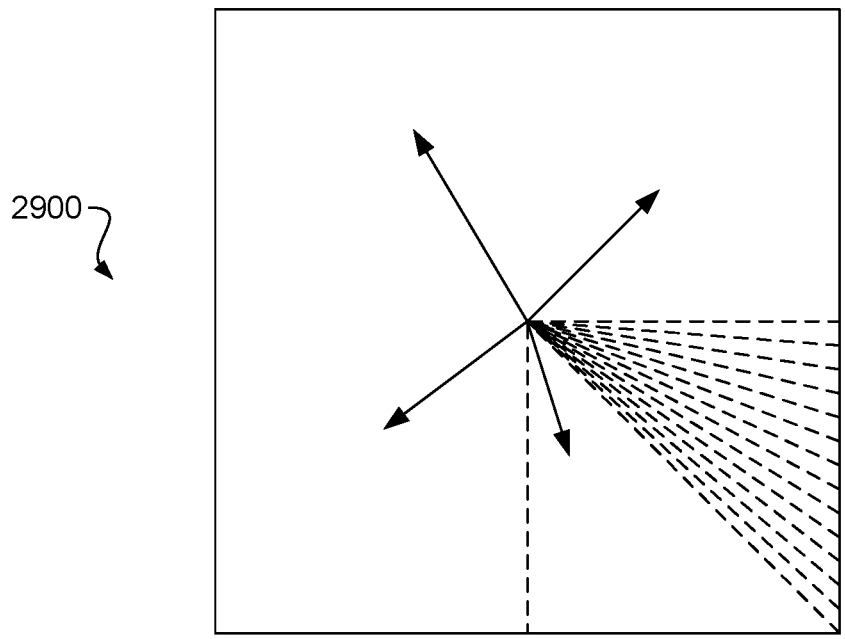
FIG. 29 depicts an example of a rectangular shaped touch surface in accordance with the disclosure.

FIG. 29 depicts an example of a rectangular overlay 2900. In this example, each angular positon will have a proximity value radial profile of a different length. However, the rectangular overlay 2900 may be divided into sections that approximate the proximity value radial profiles and allow for proximity value adjustments as described in this disclosure. While this example has been depicted with a rectangular shaped touch surface, the touch surface may have any appropriate shape including, but not limited to, a square, a triangle, an oval, another type of shape, or combinations thereof.

Figure 30:
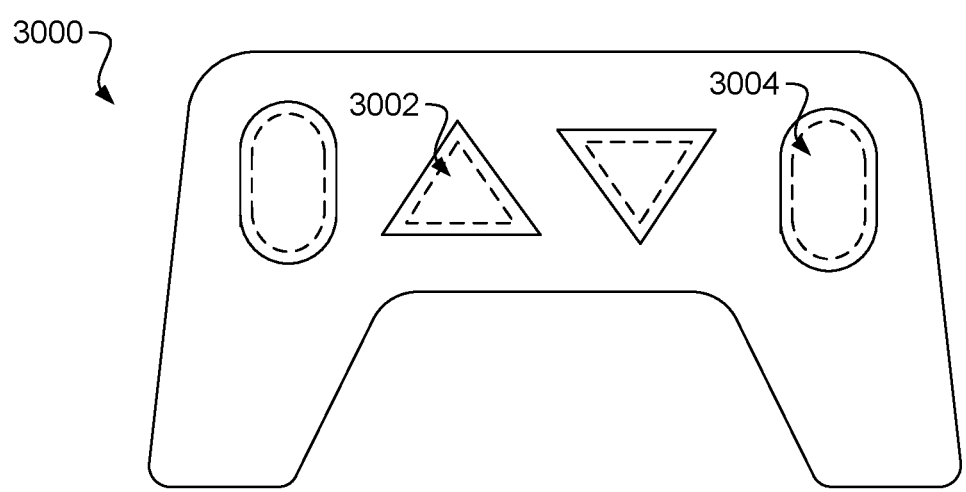
FIG. 30 depicts an example of a remote controller in accordance with the disclosure.

FIG. 30 depicts different a remote controller 3000 that incorporates triangular overlays 3002 and oblong overlays 3004. Each of these overlays may have non-uniform cross-sectional thicknesses and apply the principles described above.

Figure 31:
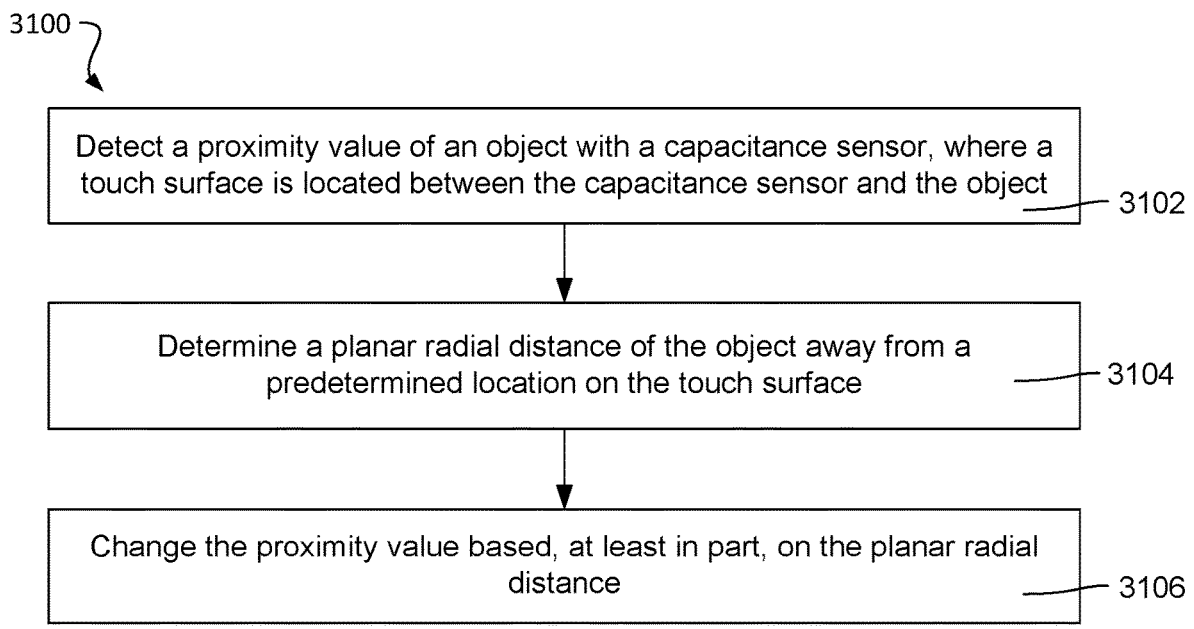
FIG. 31 depicts an example of a method of using a capacitance sensor in accordance with the disclosure.

FIG. 31 depicts an example of a method 3100 of using a capacitance sensor. This method 3100 may be performed based on the description of the devices, modules, and principles described in relation to FIGS. 1-30. In this example, the method 3100 includes detecting 3102 a proximity value of an object with a capacitance sensor, where a touch surface is located between the capacitance sensor and the object; determining 3104 a planar radial distance of the object away from a predetermined location on the touch surface; and changing 3106 the proximity value based, at least in part, on the planar radial distance.

Figure 32:
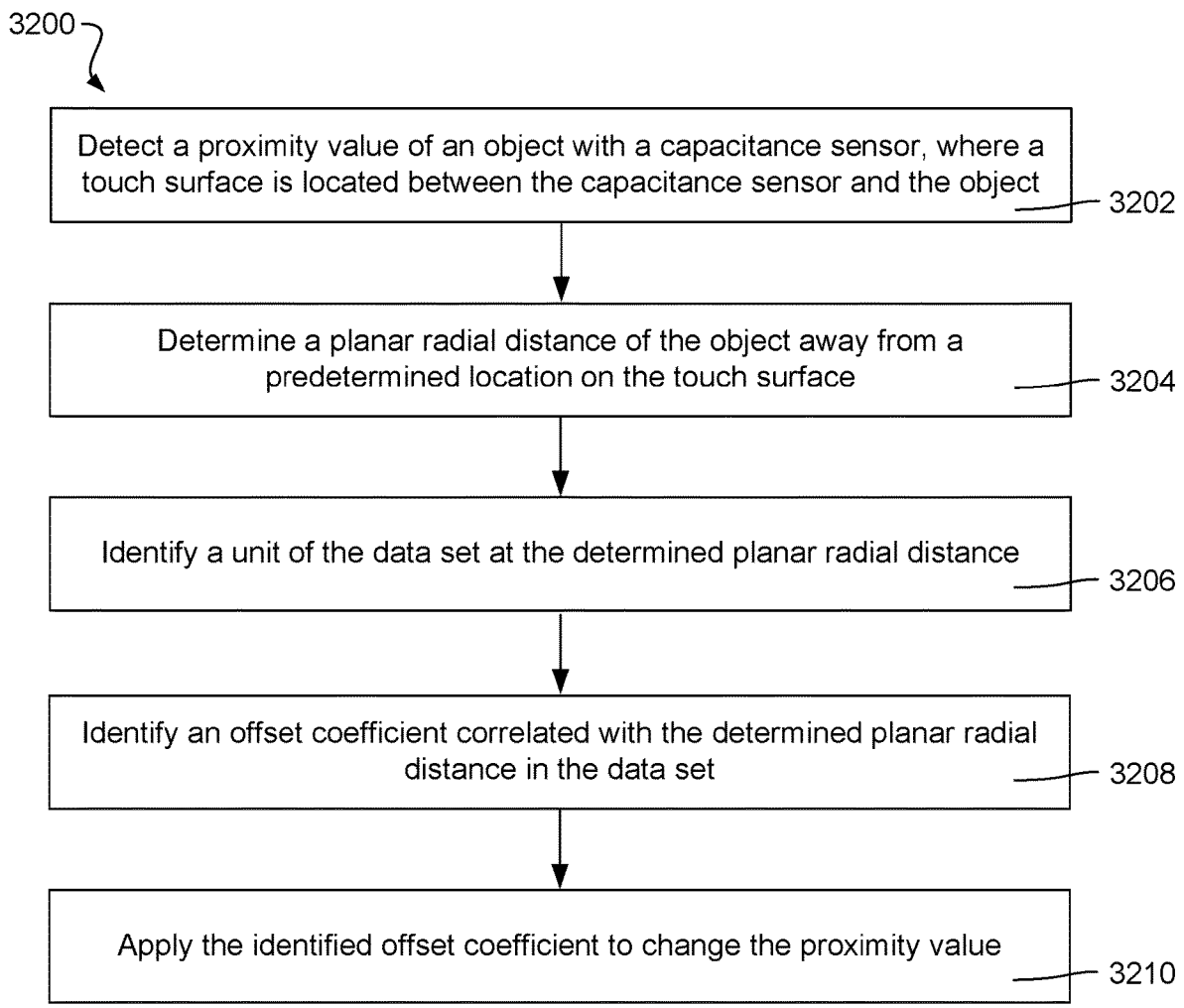
FIG. 32 depicts an example of a method of using a capacitance sensor in accordance with the disclosure.

FIG. 32 depicts an example of a method 3200 of using a capacitance sensor. This method 3200 may be performed based on the description of the devices, modules, and principles described in relation to FIGS. 1-30. In this example, the method 3200 includes detecting 3202 a proximity value of an object with a capacitance sensor, where a touch surface is located between the capacitance sensor and the object; determining 3204 a planar radial distance of the object away from a predetermined location on the touch surface; identifying 3206 a unit of the data set at the determined planar radial distance; identifying 3208 an offset coefficient correlated with the determined planar radial distance in the data set; and applying 3210 the identified offset coefficient to change the proximity value.

Figure 33:
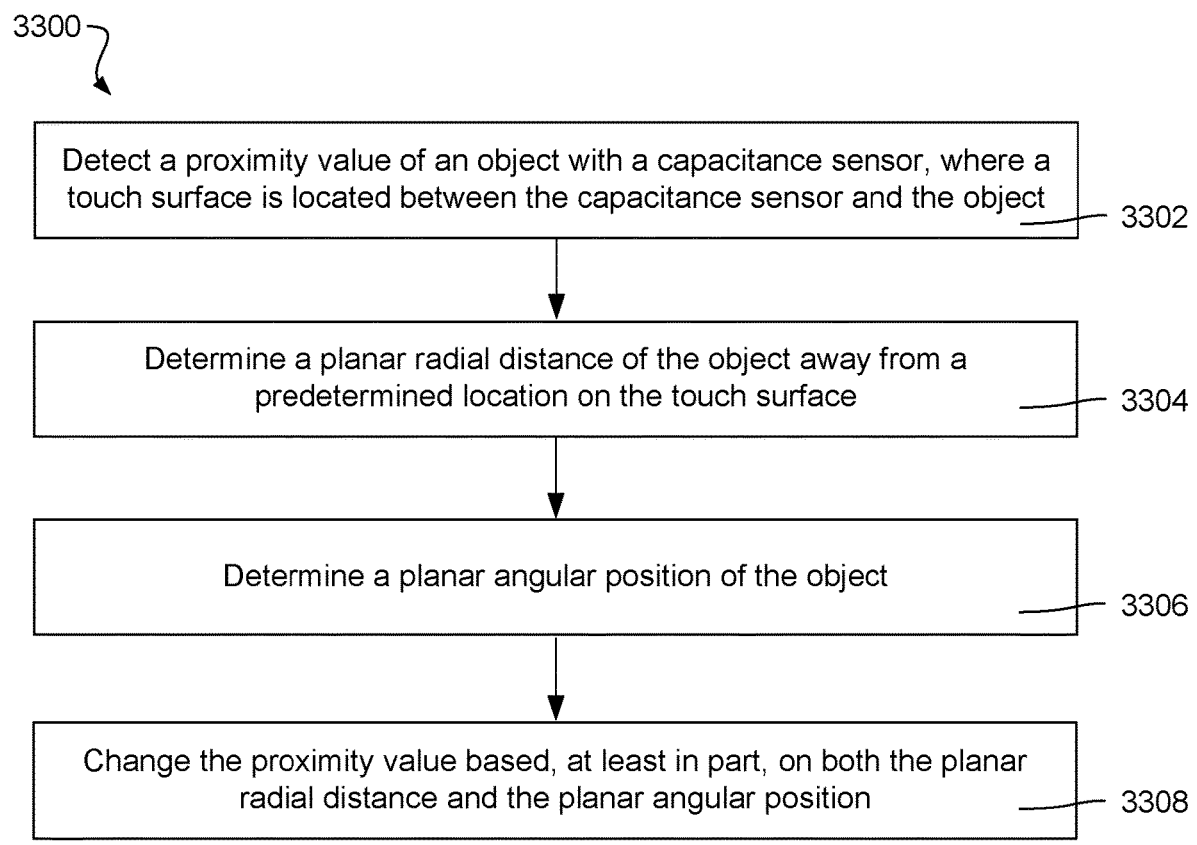
FIG. 33 depicts an example of a method of using a capacitance sensor in accordance with the disclosure.

FIG. 33 depicts an example of a method 3300 of using a capacitance sensor. This method 3300 may be performed based on the description of the devices, modules, and principles described in relation to FIGS. 1-30. In this example, the method 3300 includes detecting 3302 a proximity value of an object with a capacitance sensor, where a touch surface is located between the capacitance sensor and the object; determining 3304 a planar radial distance of the object away from a predetermined location on the touch surface; determining 3306 a planar angular position of the object; and changing 3308 the proximity value based, at least in part, on both the planar radial distance and the planar angular position.

The portable electronic device with the touch pad may be a laptop, a desktop, an external pad for providing input to a computing device or to the cloud computing device, a computing device, a networked device, an electronic tablet, a mobile device, a personal digital assistant, a control panel, a gaming device, a flat panel, a display, a television, another type of device, or combination thereof.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A device, comprising:
   a capacitance sensor;
   an overlay positioned near the capacitance sensor, the overlay including a touch surface opposite to an underside of the overlay, where the underside is positioned near the capacitance sensor;
   a controller;
   memory in communication with the controller and comprising programmed instructions that, when executed, cause the controller to:
   detect a proximity value of an object with a capacitance sensor, where a touch surface is located between the capacitance sensor and the object;
   determine a planar radial distance of the object away from a predetermined location on the touch surface; and
   change the proximity value based, at least in part, on the planar radial distance;
   wherein the planar radial distance is a distance in a direction that is aligned with the capacitance sensor.

2. The device of claim 1, wherein the predetermined location on the touch surface is a center of the touch surface.

3. The device of claim 1, wherein the touch surface includes a non-planar surface.

4. The device of claim 1, wherein the overlay has a non-uniform thickness.

5. The device of claim 1, wherein the overlay has a circular shape.

6. The device of claim 1, wherein the overlay has a symmetric proximity value sensitivity.

7. The device of claim 1, further comprising a material located between the capacitance sensor and the touch surface, wherein the material decreases a proximity value sensitivity.

8. The device of claim 1, wherein a change made to the proximity value is the same regardless of a planar angular position of the object with respect to the predetermined location.

9. The device of claim 1, further including a data set of offset coefficients associated with the planar radial distance;
   wherein changing the proximity value includes, at least in part:
   identifying a unit of the data set at the determined planar radial distance;
   identifying an offset coefficient correlated with the determined planar radial distance in the data set; and
   applying the identified offset coefficient to the proximity value.

10. The device of claim 1, further comprising:
    determining a planar angular position of the object; and
    changing the proximity value based, at least in part, on both the planar radial distance and the planar angular position.

11. The device of claim 10, wherein changing the proximity value is different depending on whether the planar angular position is within a first angular range or a second angular range.

12. The device of claim 10, further including a data set of offset coefficients associated with both the planar radial distance and the angular position;
    wherein changing the proximity value includes, at least in part:
    identifying a unit of the data set at the determined planar radial distance and associated with an angular range in which the object is located;
    identifying an offset coefficient correlated with the determined planar radial distance and the angular range in the data set; and
    applying the identified offset coefficient to the proximity value.

13. The device of claim 1, wherein the device is a remote controller.

14. The device of claim 1, wherein the device is incorporated into a portable computing device.

15. A method of using a capacitance sensor, comprising:
    detecting a proximity value of an object with a capacitance sensor, where a touch surface is located between the capacitance sensor and the object;
    determining a planar radial distance of the object away from a predetermined location on the touch surface; and
    changing the proximity value based, at least in part, on the planar radial distance;

wherein the planar radial distance is a distance in a direction that is aligned with the capacitance sensor.

16. The method of claim 15, wherein the predetermined location on the touch surface is a center of the touch surface.

17. The method of claim 15, further comprising:
determining a planar angular position of the object; and
changing the proximity value based, at least in part, on both the planar radial distance and the planar angular position.

18. A computer-program product for using a capacitance sensor, the computer-program product comprising a non-transitory computer-readable medium storing instructions executable by a processor to:
detect a proximity value of an object with a capacitance sensor, where a touch surface is located between the capacitance sensor and the object;
determine a planar radial distance of the object away from a predetermined location on the touch surface; and
change the proximity value based, at least in part, on the planar radial distance;
wherein the planar radial distance is a distance in a direction that is aligned with the capacitance sensor.

19. The computer-program product of claim 18, wherein the instructions are executable by a processor to:
determine a planar angular position of the object; and
change the proximity value based, at least in part, on both the planar radial distance and the planar angular position.

20. The computer-program product of claim 19, wherein the instructions are executable by a processor to:
identify which angular range of the planar angular position;
identify a unit of the data set at the determined planar radial distance and associated with that identified angular range;
identify an offset coefficient correlated with the determined planar radial distance in the data set; and
apply the identified offset coefficient to the proximity value.

* * * * *